United States Patent [19]
Morgan et al.

[11] Patent Number: 5,498,045
[45] Date of Patent: Mar. 12, 1996

[54] BLOW MOLDED BUMPER BEAM AND U-BOLT ATTACHMENT

[75] Inventors: Terry B. Morgan, Lansing; Joseph J. Sedlock, Okemos, both of Mich.

[73] Assignee: General Motors Corporation, Detroit, Mich.

[21] Appl. No.: 356,069

[22] Filed: Dec. 14, 1994

[51] Int. Cl.$^6$ .................................................. B60R 19/24
[52] U.S. Cl. .................................................. 293/122; 293/155
[58] Field of Search .................................. 293/120, 122, 293/155; 296/146.6, 189

[56] References Cited

U.S. PATENT DOCUMENTS

| | | | |
|---|---|---|---|
| 1,494,885 | 5/1924 | Breuer et al. | 293/155 |
| 1,576,085 | 3/1926 | Brown | 293/155 |
| 1,801,761 | 4/1931 | Williams | 293/155 |
| 3,741,598 | 6/1973 | Novak et al. | 296/122 |
| 4,413,856 | 11/1983 | McMahan et al. | 296/188 |
| 4,586,738 | 5/1986 | Butler et al. | 293/107 |
| 4,715,630 | 12/1987 | Manning | 293/122 |
| 4,733,894 | 3/1988 | Lamparter | 293/120 |
| 5,080,410 | 1/1992 | Stewart et al. | 293/122 |
| 5,114,198 | 5/1992 | Yamashita et al. | 293/120 |
| 5,141,273 | 8/1992 | Freeman | 293/120 |
| 5,171,058 | 12/1992 | Ishikawa | 296/189 |
| 5,382,051 | 1/1995 | Glance | 296/189 |

*Primary Examiner*—David M. Mitchell
*Assistant Examiner*—Gary C. Hoge
*Attorney, Agent, or Firm*—Jeffrey A. Sedlar

[57] ABSTRACT

A one-piece blow molded bumper beam is provided including a series of crush initiators strategically located to inhibit initial outward deflection of the bumper beam upon impact and a pair of grooves for containing a U-bolt type retention device.

5 Claims, 2 Drawing Sheets

BLOW MOLDED BUMPER BEAM AND U-BOLT ATTACHMENT

BACKGROUND OF THE INVENTION

The present invention relates to energy absorbing vehicle bumper assemblies.

It is conventionally known to assemble a vehicle bumper which includes an impact beam and an energy absorbing medium which are covered by a fascia. With such an assembly the energy absorbing medium is secured to the impact beam prior to assembly to the vehicle. It is also known to incorporate the usual impact beam and energy absorber into one blow molded plastic part. However, such an assembly tends to be somewhat heavy and costly.

Conventional blow molded bumper beams generally incorporate a series of fastening studs which are molded into the plastic part to assist in assembly to the vehicle. It has been found however, that studs tend to be pulled out of the molded plastic part under an unacceptably low tensile load. Previous attempts to solve this problem have integrated a stud plate or stay into the molded beam to which the studs are welded. This stay however, adds undesirable weight and cost to the bumper beam assembly.

It is preferred that a bumper beam be fabricated such as to minimize costs and weight while performing acceptably when assembled to a vehicle.

SUMMARY OF THE INVENTION

The present invention presents a hollow, blow molded bumper beam which incorporates the usual impact beam and energy absorber into one plastic part and thereby reduces mass, assembly labor time and costs. Due to its unique design the blow molded bumper beam according to the present invention provides the advantage that it may be designed with a shorter offset. This means that the vehicle's bumper does not have to protrude as far away from the vehicle's other damageable body surfaces as has previously been required.

The invention preferably incorporates specific features into the bumper beam facilitating the application of U-bolts which engage the bumper beam and provide a means of attachment to the vehicle structure. With this design the means of attachment to the vehicle structure can withstand tensile forces significantly in excess of twice the load that a molded-in stud can carry.

It has been found that when a load is applied to a resilient, energy absorbing bumper beam the top surface and bottom surface tend to deflect outward from the assembly. It has been found that the top surface of the beam moves upward distances exceeding 30 millimeters upon a relatively light impact. When the top and bottom surfaces of a beam exhibit such outward displacement upon the application of a load, the potential for conflict with closely mounted vehicle components exists.

To avoid such conflict from occurring, the present invention strategically places molded-in crush initiators to direct the deflection of the top and bottom surfaces of the bumper beam inward as opposed to the conventional outward direction. Through the application of conventionally known finite element analysis, the location and geometry of the crush initiators is optimized for a given bumper beam design. The present invention also incorporates additional features to provide specific advantages over what has previously been known in the art. The following illustrations and detailed description provide further clarification thereof.

DETAILED DESCRIPTION OF THE PRESENTLY PREFERRED EMBODIMENT

Figure 1:
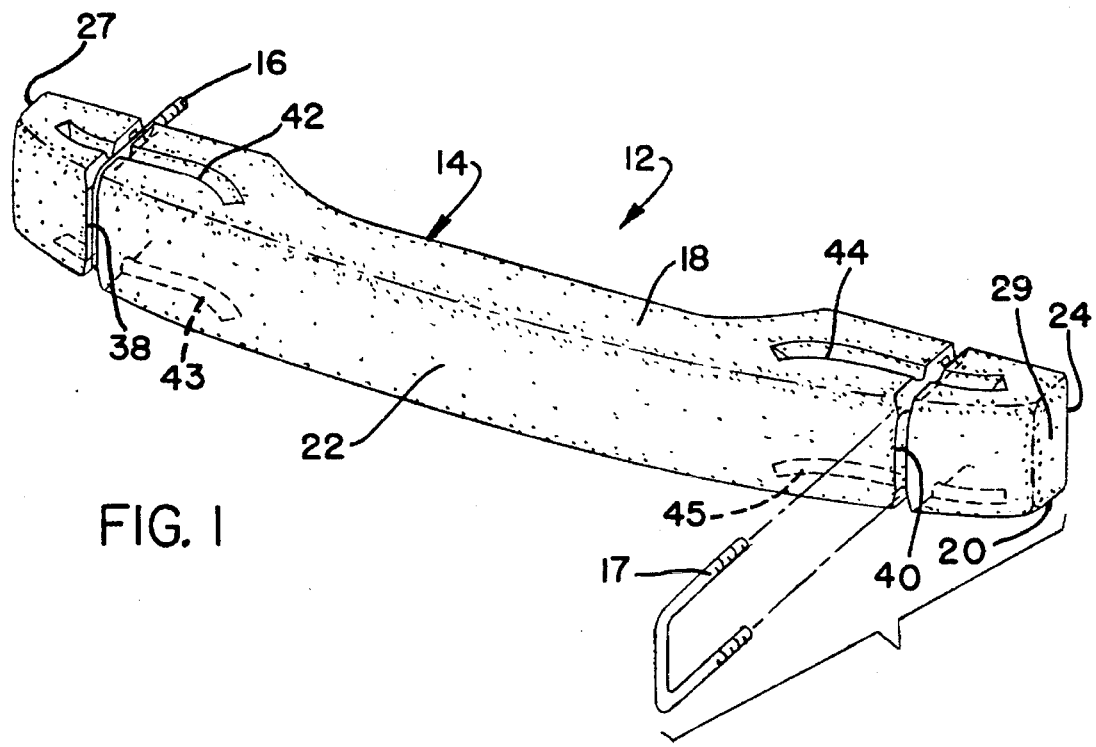
FIG. 1 is a partially exploded perspective view of a bumper beam according to the present invention.

Referring to FIG. 1, illustrated is a vehicle bumper assembly generally designated 12. A one-piece, elongated bumper beam 14 is formed from a suitable material capable of resisting damage and excessive deformation during the application of loads thereto. Numerous suitable materials are conventionally known. The cross section of the bumper beam 14 is designed to resiliently collapse during impact and effectively absorb energy. Elastic properties of the bumper beam material promote return of the bumper beam 14 to its original position.

Figure 2:
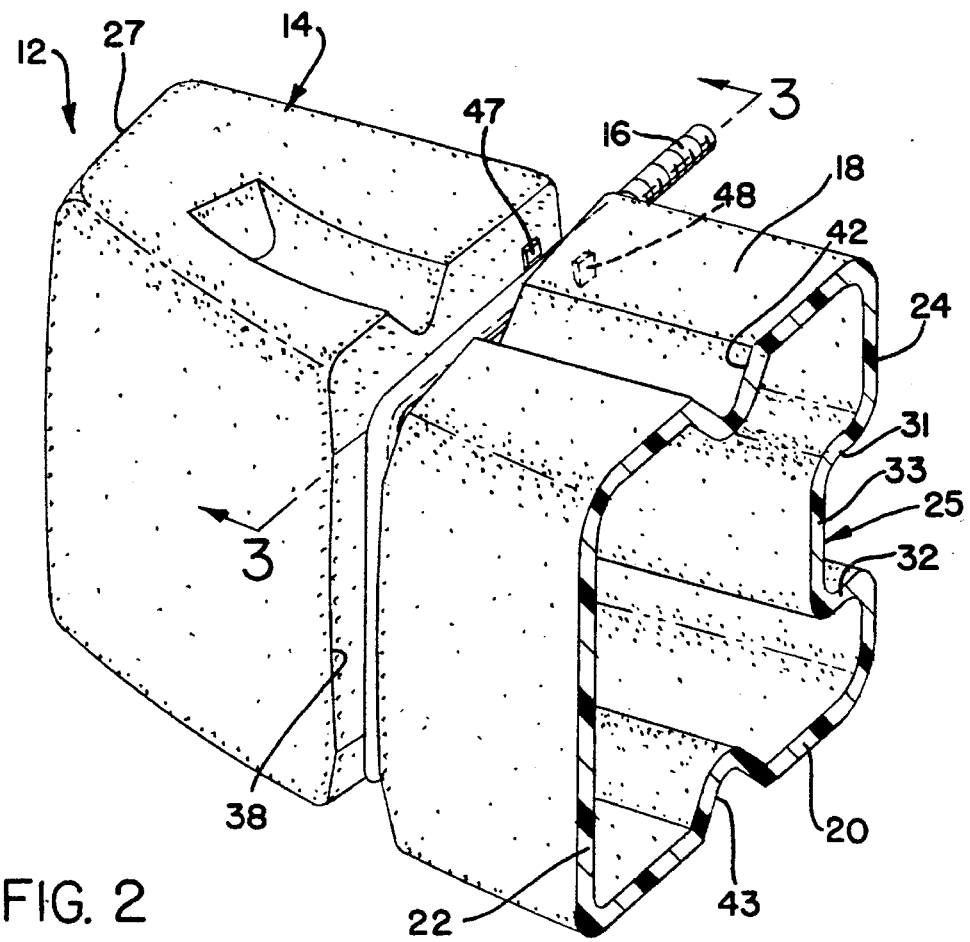
FIG. 2 is a fragmentary enlarged isometric view of a bumper beam according to FIG. 1.

Additionally referring to FIG. 2, bumper beam 14 includes first and second horizontal walls 18 and 20 connected by a front vertical wall 22 and a rear vertical wall 24. Bumper beam 14 also exhibits end walls 27 and 29. The rear vertical wall 24 is contoured in the cross-car direction such as to generally mate with the front surface of a vehicle body (not illustrated) upon which it is intended to be mounted. Rear vertical wall 24 generally includes four conventional molded-in studs (not illustrated), which are located inboard from the U-bolts 16 and 17. The rear vertical wall 24 also incorporates a longitudinal central channel 25 which is formed by third and fourth substantially horizontal walls 31 and 32 and a central vertical wall 33. The bumper beam 14 is molded as one piece according to conventionally known methods. Concurrent with the molding process U-bolt grooves 38 and 40 and crush initiators 42 through 45 are formed.

Each U-bolt groove is formed on three sides of the bumper beam 14 transversely across first horizontal wall 18, front vertical wall 22 and second horizontal wall 20. The U-bolt groove 38 provides a form fit for the U-bolt 16.

Due to the reaction of bumper beam 14 to certain impacts, the U-bolts 16 and 17 are placed in tension. This creates a potential for shearing of the bumper beam 14 at the bumper beam/U-bolt interface. It has been found that by providing the form fitting U-bolt groove 38, shearing of the bumper beam 14 by the U-bolt 16 is substantially eliminated for minor impacts. The molded-in U-bolt groove 38 also eliminates the need for secondary operations such as drilling that would be required to otherwise fasten the U-bolt 16 to the bumper beam 14.

Figure 3:
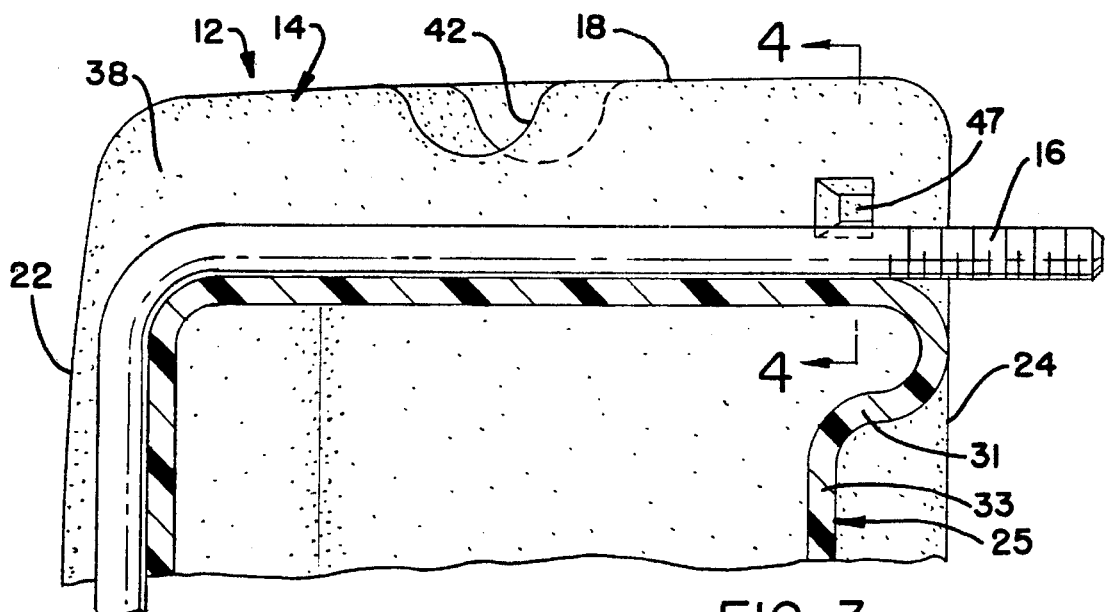
FIG. 3 is a sectional view taken generally through the plane indicated by the line 3—3 in FIG. 2.
Figure 4:
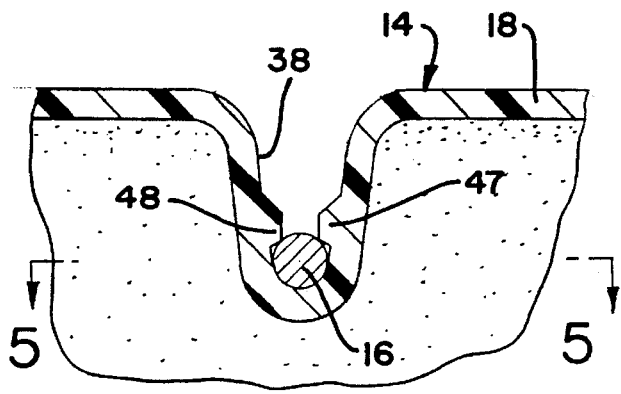
FIG. 4 is a sectional view taken generally through the plane indicated by the line 4—4 in FIG. 3.
Figure 5:
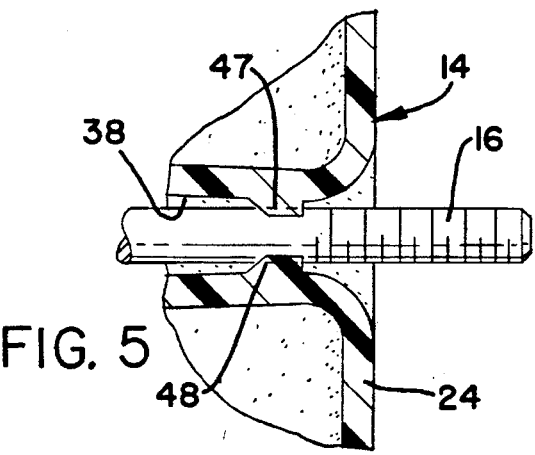
FIG. 5 is a sectional view taken generally through the plane indicated by the line 5—5 in FIG. 4.

Referring additionally to FIGS. 3, 4 and 5, the U-bolt groove 38 includes retaining tabs 47 and 48 which serve as a means for retaining the U-bolt 16 in U-bolt groove 38. The retaining tabs 47 and 48 provide a press fit for the U-bolt 16 such that the U-bolt 16 does not back out when the bumper beam 14 is pushed on to the front of a vehicle structure (not illustrated) to secure the bumper beam 14 thereto. A pair of retaining tabs such as retaining tabs 47 and 48 is provided at two locations in each of the U-bolt grooves 38 and 40 near the terminal ends of each groove adjacent the rear vertical wall 24.

Prior to the bumper assembly 12 being assembled to the vehicle structure, U-bolts 16 and 17 are applied to U-bolt grooves 38 and 40, respectively and are retained therein by the corresponding U-bolt retaining tabs. The two terminal ends of each U-bolt 16 and 17 and the four molded-in studs are inserted through corresponding openings in the vehicle's mating surface. A nut is applied to each terminal end of the U-bolt 16 and 17 and the molded-in studs to retain the bumper assembly 12 on the vehicle. The retaining tabs in the U-bolt grooves 38 and 40 help retain the U-bolts 16 and 17 in position during this process.

During an impact such as at the center of the front vertical wall 22 the U-bolts 16 and 17 will experience a tensile stress. By placing the U-bolts 16 and 17 at the outboard positions from the molded-in studs, the present invention provides a means for substantially increasing the load that the bumper assembly 12 is able to withstand without detaching the fasteners from the bumper beam 14.

Referring to FIG. 1, it is apparent that crush initiator 42 exhibits a generally serpentine configuration which somewhat follows the contour of the rear vertical wall 24. The crush initiators 42–45 form generally, inward-offset or trough-like depressions as viewed from the exterior of first and second horizontal walls 18 and 20. When force is applied to the vehicle such as to deform the bumper assembly 12, the crush initiators 42 through 45 provide a means for deflection of the first and second horizontal walls 18 and 20 to occur inward towards one another as the front vertical wall 22 is deflected towards the rear vertical wall 24. The crush initiators 42–45 of the present embodiment are positioned such as to provide inward deflection of the first and second horizontal walls 18 and 20 at locations selected to avoid damage to vehicle lamps (not illustrated). The selected location of crush initiators for a particular embodiment is determined according to each application's needs.

By providing the crush initiators 42 through 45 the mounting of fragile vehicle components relatively adjacent the first and second horizontal walls is made possible while avoiding conflict therewith, that could otherwise occur from bumper beam deflection during relatively minor impacts.

What is claimed is:

1. A bumper beam comprising a one-piece molded assembly having a substantially vertical front wall, at least one substantially horizontal wall that includes at least one crush initiator formed integrally with the substantially horizontal wall providing an inward offset in the outer surface of the substantially horizontal wall such that upon impact at the substantially vertical front wall initial deflection of the substantially horizontal wall occurs into the bumper beam, and further comprising at least one groove in the substantially horizontal wall substantially perpendicular to, and intersecting, the crush initiator.

2. A bumper beam according to claim 1 further comprising a pair of retaining tabs disposed in the groove.

3. A bumper beam according to claim 2 further comprising a U-bolt positioned in the groove and engaged by the retaining tabs.

4. A bumper assembly comprising:

a bumper beam having an elongated resilient hollow structure with a substantially vertical front wall, a pair of substantially horizontal walls connected by the substantially vertical front wall, a substantially vertical rear wall extending between the pair of substantially horizontal walls incorporating a longitudinal molded in central channel, a crush initiator forming a trough-like depression in one of the substantially horizontal walls, a groove extending transversely across the pair of substantially horizontal walls and the substantially vertical front wall and a pair of retaining tabs formed in the groove.

5. A bumper assembly according to claim 4 further comprising a U-bolt positioned in the groove and engaged by the retaining tabs.

* * * * *